United States Patent [19]
Peresleni Rivet et al.

[11] Patent Number: 5,767,214
[45] Date of Patent: Jun. 16, 1998

[54] PROCESS FOR PREPARING (CO) POLYCHLOROPRENE RUBBER

[75] Inventors: Nathalie Peresleni Rivet, Grenoble; François Sauterey, Champ Drac, both of France

[73] Assignee: Enichem Elastomers France S.A., Courbevoie, France

[21] Appl. No.: 893,989

[22] Filed: Jul. 16, 1997

Related U.S. Application Data

[63] Continuation of Ser. No. 529,155, Sep. 15, 1995.

[30] Foreign Application Priority Data

Sep. 16, 1994 [FR] France ................... 94 11461

[51] Int. Cl.⁶ ............... C08F 36/18; C08F 2/32
[52] U.S. Cl. ............ 526/295; 526/87; 526/338; 526/339; 526/340; 526/340.1
[58] Field of Search ............................. 526/87

[56] References Cited

U.S. PATENT DOCUMENTS

| | | |
|---|---|---|
| 3,890,261 | 6/1975 | Fitzgerald . |
| 4,082,714 | 4/1978 | Lo Scalzo et al. . |
| 5,053,468 | 10/1991 | Branlard et al. ............ 526/206 |
| 5,322,886 | 6/1994 | Sauterey ..................... 524/707 |
| 5,357,010 | 10/1994 | Sauterey et al. ............ 526/220 |

FOREIGN PATENT DOCUMENTS

| | | |
|---|---|---|
| 2059425 | 1/1992 | Canada . |
| 0 495 365 A1 | 7/1992 | European Pat. Off. . |
| 2208915 | 6/1974 | France . |

*Primary Examiner*—Fred Zitomer
*Attorney, Agent, or Firm*—Burns, Doane, Swecker & Mathis, L.L.P.

[57] ABSTRACT

Process for preparing (co)polychloroprene rubber, comprising:

a first step (a) in which a portion of a polymerizable composition is partially polymerized according to a batchwise process, a second step (b) in which the residual polymerizable composition is sequentially fed to the reaction mixture coming from the step (a), a possible third step (c) in which the reaction mixture coming from the step (b) is polymerized up to the desired conversion rate.

20 Claims, 1 Drawing Sheet

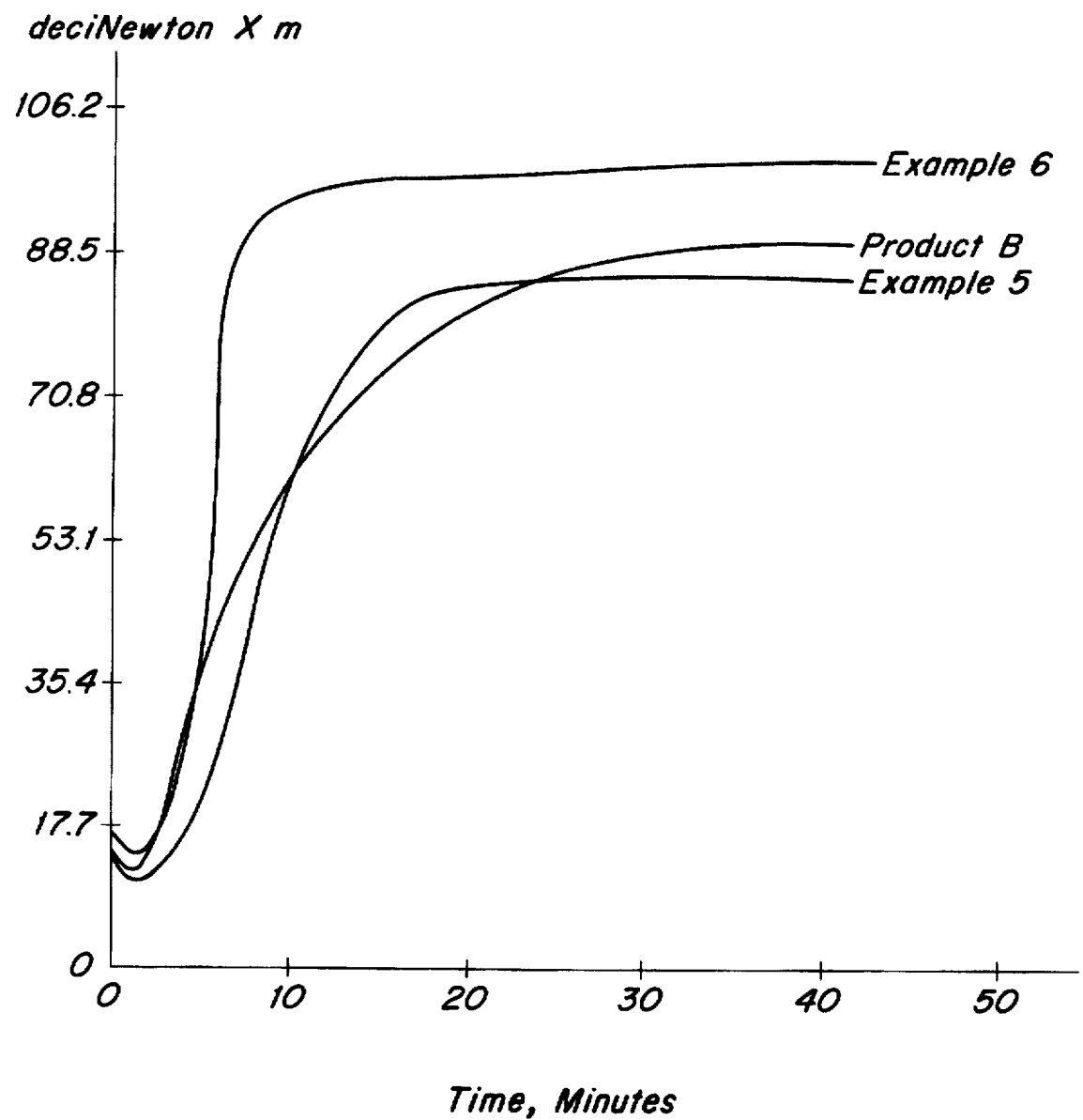

PROCESS FOR PREPARING (CO) POLYCHLOROPRENE RUBBER

This application is a continuation of application Ser. No. 08/529,155, filed Sep. 15, 1995.

The present invention relates to a process for preparing (co)polychloroprene rubber.

More specifically, the rubber according to the present invention is prepared by emulsion polymerizing a polymerizable composition essentially constituted by chloroprene or a chloroprene mixture with one or more copolymerizable monomers.

The classic way to prepare polychloroprene or copolychloroprenes in alkaline aqueous emulsion is well known in the art.

At present, most (co)polychloroprene rubbers are prepared by means of a batchwise process. This process, as well as the corresponding continuous process, are affected by some drawbacks, some of which are summarized as follows.

A first drawback relates to safety and derives from the fact that chloroprene is highly toxic and flammable and forms explosive mixtures with air. As a consequence, particular attention must be paid especially to chloroprene polymerization initiation because at that point the chloroprene concentration inside the reactor is very high.

Another disadvantage which affects the process known in the prior art is that copolymerizing chloroprene with other copolymerizable monomers, such as dienes, vinyl aromatic compounds, unsaturated acids, ester and nitrile derivatives of unsaturated carboxy acids, is very difficult.

Another drawback shown by the batchwise processes known in the prior art, is their reduced productivity.

The purpose of the present invention is provide a process for preparing rubbers by chloroprene polymerization or copolymerization, which overcomes the drawbacks cited above.

For that purpose, the process according to the present invention is carried out by emulsion polymerizing monomers essentially constituted by chloroprene or a mixture of chloroprene with one or more copolymerizable monomers. This process is characterized in that:

- a starting emulsion is formed which contains a fraction of monomers and from which the polymerization is started;
- the reaction medium is fed together with the remaining amount of the monomers, and, possibly, with the balance of the other components which constitute the reaction medium;
- the polymerization is allowed to continue until an overall conversion rate (TC) of the monomers to polymers is reached which is comprised within the range of from 60 to 85%, preferably from 65 to 80%; and
- essentially throughout the course of the polymerization an instant ratio of monomer:polymer (M:P), by weight, is maintained which is higher than, or equal to, about 0.20, preferably about 0.25, and still more preferably, about 0.30.

This operating modality corresponds to a first preferred embodiment of the process according to the present invention.

According to a second embodiment of the invention, the following steps are provided:

- a first polymerization step (a) in which an aliquot (A) of monomers, by weight, is fed, and the polymerization is allowed to proceed until a conversion rate (CR) is reached which is comprised within the range of from 3 to 80%, preferably of from 8 to 45%, and still more preferably of from 10 to 30%;
- and a second step (b) in which the reaction medium is fed together with at least the balance (B) of the monomers, by weight, is fed, with at least the feed stream being controlled in such a way that the ratio of M:P never becomes lower than the threshold values as defined hereinabove for the first preferred embodiment.

According to such a preferred embodiment, the preliminary step (a) is a well distinct and time-limited sequence.

In the event when in the polymerization chloroprene and monomers of at least one other type participate as monomers, the proportions of the several comonomers may have variable values:

- in the starting reaction medium and in the feed stream [first embodiment without (a) step];
- in the A fraction and in the B fraction [second embodiment with (a) step].

The selection of these proportions has a great influence on the polymerization kinetics. This selection is perfectly within the skill of those skilled in the art.

According to an advantageous way of practicing the invention, the A fraction of (a) step represents from 1 to 50%, preferably from 3 to 25%, by weight, of the monomers.

Of course, the feed of the reaction medium with the B fraction can be carried out either batchwise or continuously. According to the present invention, in practice, continuous feed is the most frequently used operating way.

By varying the feed rate and therefore the amount of monomers added to the reaction medium, the ratio of M:P can be controlled and adjusted.

The other components of the reaction medium are added either simultaneously with the monomers, or at a different time.

In general, the monomer feed is discontinued before the (co)polymerization reaches the maximum values as defined above for the conversion rate CR. However, also operating according to the opposite modality falls within the scope of the invention.

Inasmuch as the feed of the monomers is discontinued before the threshold values of CR are reached, one might consider that a last (c) step exists which corresponds to polymerization end, which follows the (b) step.

According to another variant of the invention, the starting reaction medium also comprises (co)polymers and, preferably, polychloroprene. These constitute a kind of "seed" or "starter agent" constituted by a kind of emulsion of polymers which may be either identical to, or different from, the emulsion of (co)polymers which one wishes to obtain, it being understood that polychloroprene is particularly suitable for this purpose, also in the case of (co) polymerization.

According to the present invention, the reaction medium should therefore be preferably kept under conditions of slight monomer deprivation. In such a way, the ratio of M:P will be comprised within the range of from, e.g., 0.3 to 2.

The process according to the present invention can also be carried out inside one single reactor ("one pot process"); however, also a plurality of reactors can be used as well.

The polymerization is carried out by means of the current polymerization techniques in alkaline aqueous emulsion, in the presence of one or more tranfer agent and one or more free radical initiators.

All emulsifiers and protecting colloids can be used in the process according to the present invention. From these agents, the water soluble salts, in particular sodium, potassium or ammonium salts, of the following compounds can be cited: long-chain fatty acids, resin or gem resin derivatives, talloil, partially polymerized, isomerized or modified resin; fatty alcohol sulfates, alkyl sulfates and alkyl sulfonates; alkaline salts af alkylarylsulfonic acids as well as of condensation products of formol with aryl-sulfonic acids, as, e.g., naphthalene-sulfonic acid; and ethylene oxide-phenol condensates.

The dispersing agent is preferably selected from the condensation products of formaldehyde with naphthalene-sulfonic acid or other sulfonates.

As free radical initiators, those compounds with peroxide character can be mentioned in particular, as alkali-metal or ammonium persulfates, hydrogen peroxide, organic or mineral peroxides, such as cumene peroxide, benzoyl peroxide, as well as alkali-metal and ammonium ferrocyanides, or some redox systems.

The transfer agent, or modifier agent, can be selected from iodoform, alkyl-xanthogen disulfides, alkyl mercaptans or still other sulfur bearing organic compounds.

The emulsion pH is preferably within the range of from about 11 to 13.

The polymerization is carried out under an inert atmosphere in the absence of oxygen, with the temperature being within the range of from 5° to 80° C., preferably from 10° to 50° C.

The monomers used in the practice of the process of the present invention essentially consist of either chloroprene alone or a chloroprene mixture with one or more polymerizable (co)monomers.

The copolymerizable (co)monomers with chloroprene are vinyl-aromatic compounds, e.g., styrene, vinyltoluenes, vinylnaphthalenes; unsaturated monocarboxy or dicarboxy acids, e.g., acrylic and methacrylic acid, itaconic acid, maleic acid, vinyl acetic acid, 2-(carboxy-methyl)acrylic acid; ester and nitrile derivatives of unsaturated carboxy acids, in particular $C_1$–$C_6$-alkyl acrylates and methacrylates, acrylonitrile, methacrylonitrile; conjugated diolefins, e.g., 1,3-butadiene, isoprene, isobutadiene, 1-chlorobutadiene, 2,3-di-chlorobutadiene, 2,3-dimethylbutadiene; vinyl eters, eters and ketones, e.g., vinyl acetate, methylvinyl ether, methylvinyl ketone; sulfur.

According to a preferred embodiment, the monomers used are essentially constituted by chloroprene or a mixture of chloroprene and 1-chlorobutadiene, in which the 1-chlorobutadiene amount can constitute up to 50%, preferably up to 20%, by weight, of total monomers weight.

According to the process of the present invention, copolymers can be obtained which contain a level of comonomers, in particular 1-chlorobutadiene, which is higher than as obtained, with the loading being the same, with the batchwise process known from the prior art.

Furthermore, according to another aspect, the present invention also relates, as a novel industrial product, to a chloroprene copolymer with at least one other comonomer in which at least one of the other comonomers is 1-chlorobutadiene, in which the latter can be present in an amount which is preferably lower than, or equal to, 50% by weight and, still more preferably, lower than or equal to 20% by weight, with reference to the total copolymer weight.

The invention also relates to a rubber composition based on this novel copolymer.

In the first step (a) of the second preferred embodiment of the process according to the present invention, the reactor is charged with a fraction A of the monomers which is comprised within the range of from 1 to 50% by weight, preferably of from 3 to 25% by weight, based on total monomers amount. In this step (a), the monomers are polymerized according to the batchwise process. In other terms, the reactor is charged with a portion of the monomers, in such a way as to form the starting emulsion with the usual additives (water, soap, dispersing agent). The concentration of monomers in the emulsion is generally comprised within the range of from 30 to 70% by weight, based on total emulsion weight.

The polymerization is carried out in the presence of free radical initiators and transfer agents.

In the first step (a) of the second embodiment of the process of the present invention, with said emulsion only 3–40%, preferably 10–30% of total reactor volume is filled.

The batchwise polymerization of the first step (a) is carried out according to a well known process, i.e., by adding the free radical initiator to the emulsion containing reactor and cooling said reactor in order to keep it at the desired temperature level.

The conversion rate of the monomers at the end of the first step is critical. This conversion rate should be comprised within the range of from 3 to 80%, preferably of from 8 to 45%, still more preferably of from 10 to 30%. Preferably, the high limit should not be exceeded. In fact, too high of a conversion rate can cause crosslinking to occur. On the contrary, too low of a conversion rate can cause a second population to be formed during the course of the second step, and the reaction speed to decrease.

The duration of the first step may vary as a function of the reaction temperature and of monomer reactivity, and is usually comprised within the range of from 5 to 30 minutes, preferably of from 10 to 20 minutes.

The second step (b) of the second preferred embodiment of the process according to the present invention consists in progressively adding the residual B monomer fraction. The free radical initiator, soap, water and dispersing agent must also be progressively added.

During the (b) step, the residual B fraction can be fed with an either constant or variable feed rate, preferably with a constant feed rate. Should the reaction be very fast, the flow rate will be increased, should the reaction be slow, the flow rates will be decreased.

In order to prevent gel from being formed, and to obtain the desired viscosity, the flow rates with which the residual B fraction, the catalyst and soap are added to the reaction mixture [(b) step] are very important. These flow rates should be very well controlled, because it is important that in the reaction mixture a ratio of the residual monomer(s) to the polymer (M:P) is always (and, above all, during the course of the feed) kept which is higher than or equal to 0.20, preferably higher than or equal to 0.25 and, still more preferably, higher than or equal to 0.30. In practice, the value of the M:P ratio is within the range of, e.g., from 0.30 to 2. A lower value of M:P ratio than 0.20 may cause formation of gel to occur.

The duration of the (b) step may vary as a function of the reaction temperature and of the reactivity of the polymerizable composition, and usually is comprised within the range of from 100 to 200 minutes and, preferably, of from 130 to 180 minutes.

The third step (c) according to the second preferred embodiment of the process according to the present invention consists of a possible polymerization step with controlled consumption of the residual portion of monomers until the desired conversion rate is reached, which should be within the range of from 60 to 85%, preferably of from 65 to 80%.

The duration of the third step (c) depends on the desired conversion rate value and is usually within the range of from 30 to 100 minutes.

When the desired conversion rate is reached, the polymerization is discontinued by adding conventional polymerization inhibitors. It is also possible to introduce, at polymerization interruption time, such conventional antioxidant compounds as di-tert.butylparacresol, 2,2'-methylene-bis(6-t-butyl-p-cresol), 2,2'-thiobis-(4,6-di-t-butylphenol), 2,6-di-t-butyl-4-phenylphenol.

After the removal of monomer residues, and possible addition of antioxidant compounds, the (co) polychloroprenic rubber can be recovered according to any known modalities, for example, by precipitation caused by an electrolyte or by coagulation on a cold cylinder or a steam-heated cylinder, washing and drying.

These (co)polychloroprenic rubbers have a storage stable Mooney viscosity. They can be vulcanized by means of the conventional vulcanization systems.

As compared to rubbers obtained according to the classic (either batchwise or continuous) polymerization processes, the rubbers obtained according to the process of the present invention display the advantage that they can accept larger amounts of fillers such as, e.g., carbon black, without thereby displaying any impairment of mechanical properties.

The process according to the present invention displays many other advantages:

(a) an increase in productivity:

the polymerization times are nearly identical, but when, e.g., the polymerization is carried out batchwise in a reactor of 10 m³ capacity, at polymerization end there are approximately 9 m³ of latex; when the polymerization is carried out according to the process of the present invention, 9.8 m³ of latex can be obtained with loading being the same;

(b) a higher safety:

according to the batchwise process, at reaction beginning there are, based on charged batch, approximately 50% of monomer: inside a reactor of 10 m³ of capacity there are 5 m³ of chloroprene; according to the process of the present invention, at polymerization beginning, the level of monomer is of 20% at maximum, based on charged batch; therefore, inside a reactor of 10 m³ of capacity there will be an amount of at maximum 0.7 m³ of chloroprene.

The following examples are reported for non-limitative purpose. In all examples, the polymerization reaction is monitored by means of two methodologies:

measurement of calories (instant measurement);

determination of conversion rate into solid species.

EXAMPLES

Example No. 1

| Reactor loading: | |
| --- | --- |
| Chloroprene (CP) | 8.70 parts* |
| Mercaptan | 0.02 parts* |
| Deaerated softened water | 61 parts* |
| Modified rosin | 0.52 parts* |
| Sodium hydroxide | 0.084 parts* |
| ** Daxad 15 | 0.098 parts* |

* parts per 100 parts of CP
** A water-soluble dispersing agent corresponding to the sodium salt of naphthalene sulfonic acid condensed with formaldehyde.

The reaction medium is heated up to the desired polymerization temperature (42° C.) under a nitrogen atmosphere.

When that temperature is reached, the catalyst is fed: 2% (by weight/weight) sodium persulfate and 1% sodium hydrosulfite.

When the conversion has reached 15% (15 minutes), the aqueous and organic phases and the catalyst (2% sodium persulfate and 1% sodium hydrosulfite) are fed with a constant feed rate [(b) step].

| Composition of aqueous phase: | |
| --- | --- |
| Softened water | 19 parts* |
| Modified rosin | 2.09 parts* |
| Sodium hydroxide | 0.445 parts* |
| "Daxad 15" | 0.388 parts* |
| Composition of organic phase: | |
| Chloroprene (CP) | 91.3 parts* |
| Mercaptan | 0.235 parts* |

*parts per 100 parts of CP

The above solutions are fed during a time period of 150 minutes. At feed beginning, the ratio of residual monomer to polymer, M:P, is of approximately 1.98; 30 minutes later, it is of 0.88; 60 minutes later it is of 0.62; 90 minutes later it is of 0.55; 120 minutes later it is of 0.48 and 150 minutes later (end of continuous additions) it is of 0.42. At the end of the (b) step, the conversion rate of CP is of 60%.

The polymerization [(c) step] is discontinued when a conversion rate CR of 75% is reached, by adding a chloroprene emulsion containing 0.01 parts of t-butyl-catechol and 0.003 parts of phenothiazine.

The monomer residues are then removed by steam stripping, then polychloroprene is recovered by coagulating the latex, adjusted at a pH value of 6.5, on a cylinder kept cool at −20° C. The resulting film is washed and then dried.

The resulting polymer has a Mooney viscosity (ML 1+4 at 100° C.) of 38.

Following Table 1 displays the aging behaviour of the resulting polymer and, for comparative purpose, the properties of both polymers, A1 and A2, as prepared at 40°–42° C. by means of the classic batchwise method.

TABLE 1

| References | Example 1 | Comp. Ex. A1 | Comp. Ex. A2 |
| --- | --- | --- | --- |
| ML 1 + 4 @ 100° C., initial value | 38 | 42 | 40 |
| after 3 d @ 70° C. | +1 | +4 | +5 |
| after 5 d @ 70° C. | +1 | +4 | +5 |
| after 7 d @ 70° C. | +2 | +5 | +7 |
| after 10 d @ 70° C. | +3 | +7 | +9 |

* d = days at temperature noted

One will observe that, as regards the aging properties, the polymer prepared according to the present invention displays better characteristics than those prepared according to the classic batchwise procedure.

The properties of the vulcanizates (vulcanization carried out at 150° C. during 40 minutes) are displayed in Table 2. The initial properties are practically identical; on the contrary, the properties measured after aging demonstrate that the product prepared according to the present invention has a higher heat resistance.

TABLE 2

| References | Example 1 | Comp. Ex. A1 | Comp. Ex. A2 |
|---|---|---|---|
| Elongation, % | 380 | 375 | 395 |
| after 3 d @ 100° C. | 375 | 350 | 365 |
| after 21 d @ 100° C. | 204 | 156 | 159 |
| Tensile strength, | | | |
| MPa | 17.5 | 18.2 | 18.9 |
| after 3 d @ 100° C. | 17.5 | 17.0 | 17.3 |
| after 21 d @ 100° C. | 14.7 | 11.6 | 13.6 |

* d = days at temperature noted.

Example No. 2

According to the process disclosed in Example No. 1, 4.35 parts/100 parts of monomer are charged to the reactor [(a) step]. The polymerization is carried out at 42° C.; the conversion rate CR of the monomer at the end of the first step (10 minutes) is of 16%. The addition of organic (95.65% of monomer+mercaptan) and aqueous (water, resin, Daxad 15, sodium hydroxide) phases and of catalyst is carried out during 150 minutes [(b) step]. At the beginning of the (b) step, the ratio of residual monomer to polymer M:P is of about 1.30; after 30 minutes it is of 1.0; after 60 minutes it is of 0.80; after 90 minutes it is of 0.72; after 120 minutes it is of 0.70; and after 150 minutes, it is of 0.65. At the end of (b) step, the conversion rate CR of monomer is of 55%. The reaction [(c) step] is discontinued when the conversion rate reaches the value of 75%.

Total reaction time: 240 minutes.

The rubber displays a Mooney viscosity (ML 1+4 at 100° C.) of 47.

After 3-day aging at 70° C., the Mooney viscosity is of 48.

The so obtained rubber displays a different molecular weight distribution (as determined by G.P.C.—Gel Permeation Chromatography) than as of polymers prepared according to the batchwise process:

$M_w=419\times10^3$, $M_n=131\times10^3$, $Ip$ (polymer polidispersity index)= 3.20.

A rubber prepared according to the batchwise process (Mooney viscosity=48) displays the following characteristics:

$M_w=431\times10^3$, $Mn=160\times10^3$, $Ip=2.68$.

The properties of raw and vulcanized compounds as a function of carbon black level, expressed as phr (parts per hundred parts of rubber) are reported in following Table 3.

In said Table, also the properties are reported of (raw and vulcanized) compounds, as obtained from polymerized rubber according to the batchwise process (A1). Mooney viscosity is ML 1+4 viscosity at 100° C.

Based on 100 parts of rubber, the raw compounds, besides variable levels of carbon black, contain magnesium oxide (4 parts), stearic acid (0.5 part), aromatic oil (5 parts), zinc oxide (5 parts), ethylene-thiourea (0.5 part).

TABLE 3

| POLYMERS | EXAMPLE No. 2 | | | | A1 | | | |
|---|---|---|---|---|---|---|---|---|
| CARBON BLACK (SRF) | 30 | 35 | 40 | 45 | 30 | 35 | 40 | 45 |
| Mooney VULCANIZATION AT 120° C. (MN. S) | 46 | 51 | 54 | 58 | 58 | 60 | 66 | 72 |
| MIN | 22 | 24 | 26 | 28 | 27 | 27 | 30 | 33 |
| +3 | 10 | 8.5 | 8 | 7.5 | 9 | 8 | 7.5 | 7 |
| +10 | 15 | 13.5 | 12.5 | 12 | 13.5 | 12 | 12.5 | 12 |
| +20 | 20.5 | 19 | 18 | 17.5 | 18.5 | 16.5 | 17.5 | 16 |
| +30 | 27.5 | 28 | 24.5 | 22 | 22 | 21 | 21 | 19 |
| MONSANTO 160° C. angle of 1° (MN.S) | | | | | | | | |
| MAX | 38 | 41 | 43 | 46 | 41 | 44 | 46 | 50 |
| MIN | 5 | 6 | 6 | 6 | 6 | 7 | 7.5 | 8.5 |
| +2 | 2.75 | 3 | 2.75 | 2.5 | 2.5 | 2.5 | 2.75 | 2.5 |
| +10 | 5 | 4.75 | 4.5 | 4.25 | 3.75 | 4.5 | 4.75 | 4.25 |
| +30 | 19 | 14.2 | 12 | 12.2 | 17 | 13 | 11.7 | 10 |

The rubbers obtained by means of the present invention allow more diluted compounds to be prepared, i.e., advantageous from a practical operating viewpoint, with the properties remaining anyway constant.

The above makes it possible cheaper compounds to be obtained, however having good mechanical properties.

For instance, Example No. 2 with 45 parts of carbon black has the same Mooney viscosity value (as determined on the compound) as of Example A1 with 30 parts of carbon black, with both neat rubbers having practically same Mooney viscosity values (as measured on the rubber) (38 and 42, respectively).

Example No. 3

Copolymerization of 1-Chlorobutadiene at 42° C.

In the (a) step, the reactor is charged with 2.5 parts/100 parts of 1-chlorobutadiene (1-CBD) and 7.5 parts/100 parts of chloroprene (CP); in this first step, the conversion is of 20% (requires 15 minutes).

Residual chloroprene is continuously added during the second step (b), during the course of 150 minutes.

At the beginning of the step (b), the ratio of monomer residues to copolymer (M/P) is of about 1.15; 30 minutes later, said ratio has decreased down to 1.09; 60 minutes later, it is of 1.02; 90 minutes later, of 1.0; 120 minutes later, of 0.96; and 150 minute, later, it is of 0.85.

The overall conversion rate (CR) at the end of the (b) step is of 60%.

The reaction is discontinued [end of (c) step] ate CR=75% (200 minutes).

The conversion rate of 1-CBD, as determined by G.C. (Gas Chromatography), is of 50%; overall conversion rate CR: 75%.

The rubber, obtained according to the same process as disclosed in Example No. 1, displays a Mooney viscosity (ML 1+4 at 100° C.), of 47.

After three-day aging at 70° C, Mooney viscosity is 52.

Comparison Example No. 4

A polymerization mixture consisting of 97.5% of CP and 2.5% of 1-CBD, is polymerized at 42° C. according to the batchwise process, until a total conversion rate CR of 75 is obtained. The conversion of 1-CBD only is of 20%.

Example No. 5

Copolymerization of 1-Chlorobutadiene at 30° C.

Reactor charging with 1-CBD: 2.5 parts/100 parts during the (a) step; 1.3 parts/100 parts during the (b) step.

Reactor charging with CP: 7.5 parts/100 parts during the (a) step, 88.7 parts/100 parts during the (b) step.

Total conversion rate CR during the (a) step: 20% (15 minutes).

Conversion rate at (b) step end: 65% (150 minutes).

At (b) step beginning, the ratio of residual monomers to copolymer M:P is of approximately 1.3; after 30 minutes, said ratio has decreased down to 1.0; after 60 minutes, it is of 0.86; after 90 minutes it is of 0.76; after 120 minutes, of 0.72, and, after 150 minutes, it has decreased down to 0.65.

Overall conversion rate CR [(c) step, after 195 minutes]: 75%.

Conversion rate (CR) of 1-CBD at polymerization end: 50%.

Properties of rubber obtained according to the procedure of Example 1:

(a) Mooney (ML 1+4 at 100° C.): 37;

(b) Mooney after 3 days at 70° C.: 40;

(c) Crystallization time:

$t_{0.5}$=2.6 hours; after 7 hours: 96% crystallization; after 24 hours: 98% crystallization;

(d) $T_g$: –38° C.

Example No. 6

Copolymerization of 1-Chlorobutadiene at 30° C.

According to the same process as disclosed in Example No. 1, 2.5 (parts/100 parts) of CP and 7.5 (parts/100 parts) of 1-CBD, are charged during the (a) step. The total conversion rate CR at the end of the first step (15 minutes) is of 25%.

(b) step: addition, with constant flow rate, of the organic (90 parts/100 parts of CP+mercaptan) and aqueous (water, resin, Daxad 15, sodium hydroxide) phases, during 150 minutes.

At (b) step beginning, the ratio of residual monomers to copolymer (M:C) is of about 1.2; 30 minutes later it has decreased down to 1.1; 60 minutes later, it is of 0.90; 90 minutes later, 0.80; 120 minutes later, 0.71; and after 150 minutes, it is of 0.65.

Conversion rate CR at (b) step end: 65%.

End conversion rate CR (after 210 minutes): 75%.

Conversion rate CR of 1-CBD: 50%.

The rubber, obtained according to the process disclosed in Example 1, shows the following characteristics:

(a) Mooney viscosity (ML 1+4 at 100° C.) equal to 48.

(b) $T_g$: –36.6° C.

(c) Crystallization time:

$t_{0.5}$=8.2 hours; after 7 hours: 40% crystallization; after 24 hours: 66% crystallization.

Example No. 7

Copolymerization of 1-Chlorobutadiene at 55° C.

By operating according to the same process as disclosed in Example No. 1, during the course of the (a) step, 2.4 (parts/100 parts) of 1-CBD and 7.6 (parts/100 parts) of CP, are charged to the reactor. The total conversion rate CR at the end of the first step (15 minutes) is of 25%

(b) step: addition, with a constant flow rate, of the organic (90 parts/100 parts of CP+mercaptan) and aqueous (water, resin, Daxad 15, sodium hydroxide) phases, during the course of 150 minutes.

At the beginning of (b) step, the ratio of residual monomers to copolymer M:P is of about 1.2; after 30 minutes, of 1.1.; after 60 minutes, of 0.90; after 90 minutes, of 0.80; after 120 minutes, of 0.71 and after 150 minutes, it is of 0.60.

End conversion rate [(c) step, after 195 minutes]: 72%.

Conversion rate of 1-CBD: 45%.

The rubber, obtained according to the same process as disclosed in Example 1 hereinabove, displays the following characteristics:

(a) Mooney viscosity (ML 1+4 at 100° C.) equal to 49.

(b) Crystallization time:

$t_{0.5}$=65 hours; after 7 hours: 19% crystallization; after 24 hours: 28% crystallization.

Examples Nos. 8 to 10

Tables 4–7 report the evaluation data of rubbers from Example Nos. 3, 5–7, respectively.

Example No. 8

The properties of rubber from Example No. 3 are reported in Table 4, in which "ETU" means "ethylene thiourea" and MTBS means "benzothiazyl disulfide".

TABLE 4

| FORMULA | | 8A | 8B | 8C | 8D |
|---|---|---|---|---|---|
| ZnO | parts | 5 | 3 | 1 | 21 |
| ETU | parts | 0.5 | 0 | 0 | 0 |
| MBTS | parts | 0 | 0 | 0 | 2 |
| Mooney viscosity of the compound | (MV4) | | 61.9 | | |
| Monsanto | max. | 99.0 | 80.0 | 79.0 | 55.0 |
| 153° C. | min. | 13.0 | 13.0 | 14.0 | 12.0 |
| Angle 3° | optimal | 12.0 | 31.5 | 61.0 | 29.0 |
| Vulcanization | mln. | 29.0 | 27.0 | 27.0 | 25.0 |
| 120° C. | +3 | 8.0 | >60 | >60 | >60 |
|  | +10 | 11.0 | — | — | — |
| MECHANICAL PROPERTIES | | | | | |
| Elongation at break (%) | 40 mn | 363.0 | 460.0 | 545.0 | 665.0 |
| Tensile strength (MPa) | 40 mn | 20.7 | 22.4 | 21.0 | 21.9 |
| Modulus 100 (MPa) | 40 mn | 2.9 | 2.2 | 1.7 | 1.5 |
| Modulus 200 (MPa) | 40 mn | 7.9 | 6.0 | 4.4 | 3.7 |
| Modulus 300 (MPa) | 40 mn | 15.8 | 12.2 | 8.8 | 7.4 |
| Hardness (PTS) | 40 mn | 61.5 | 57.0 | 52.0 | 48.0 |
| Crystallization, 12° C. | 24 hours | 77% | 89% | 90% | 79% |

From this Table one will see that chloroprene/1-chlorobutadiene copolymers obtained according to the present invention can be vulcanized without ETU.

According to the compound composition, vulcanization curves are obtained which can be at all different.

The addition of ETU yields products tending to undergo scorching.

With ETU-free formulations mechanical properties are obtained which are at all correct.

Example No. 9

Table 5 reports the evaluation data of rubbers from Examples 5 and 6, and, for comparison purposes, of two homopolymers prepared at 42° C. (A1) and at 57° C. (A4).

TABLE 5

| FORMULA | | 5 | 6 | A1 | A4 |
|---|---|---|---|---|---|
| ZnO | parts | 5 | 5 | 5 | 5 |
| ETU | parts | 0.5 | 0.5 | 0.5 | 0.5 |
| Mooney viscosity of neat rubber | | 37.0 | 40.0 | 46.0 | 41.0 |
| Mooney viscosity of the compound | (MV4) | 62.0 | 55.1 | 72.0 | 65.0 |
| Monsanto 153° C. | max. | 96.0 | 96.0 | 104.0 | 101.0 |
| | min. | 13.0 | 14.0 | 16.0 | 14.5 |
| Angle 3° | optimal | 14.0 | 8.0 | 21.0 | 21.0 |
| Vulcanization 120° C. | min. | 29.0 | 25.0 | 33.0 | 33.0 |
| | +3 | 9.0 | 7.5 | 7.5 | 7.5 |
| | +10 | 13.0 | 10.5 | 10.5 | 9.0 |
| MECHANICAL PROPERTIES | | | | | |
| Elongation at break (%) | 40 mn | 413.0 | 362.0 | 427.0 | 360.0 |
| Tensile strength (MPa) | 40 mn | 23.2 | 18.0 | 23.7 | 19.9 |
| Modulus 100 (MPa) | 40 mn | 2.7 | 2.6 | 2.7 | 2.7 |
| Modulus 200 (MPO) | 40 mn | 7.6 | 7.0 | 7.5 | 7.5 |
| Modulus 300 (MPa) | 40 mn | 15.2 | 13.7 | 14.8 | 15.5 |
| Hardness (PTS) | 40 mn | 62.0 | 60.0 | 60.5 | 62.0 |
| Crystallization, 12° C. | 7 hours | 97.0 | 19.0 | 94.0 | 39.0 |
| Crystallization, 12° C. | 24 hours | 98.0 | 37.0 | 100.0 | 60.0 |

One will observe that low-temperature polymerizations can be carried out (30° C.), even with slow crystallization rates.

By adjusting the polymerization temperature and the level of 1-chlorobutadiene, rubbers are obtained with similar mechanical properties (Examples 6 and A4) and a slower crystallization rate.

Example No. 10

In following Table 6 the evaluation is reported of the rubber from Example 7.

TABLE 6

| FORMULA | | 10A | 10B | 10D |
|---|---|---|---|---|
| ZnO | parts | 5 | 3 | 1 |
| ETU | parts | 0.5 | 0 | 0 |
| MBTS | parts | 0 | 0 | 2 |
| Mooney viscosity of the compound | (MV4) | 55.1 | — | — |
| Monsanto 153° C. | max. | 96.0 | 90.0 | 63.0 |
| | min. | 14.0 | 14.0 | 14.0 |
| Angle 3° | optimal | 8.0 | 22.0 | 24.0 |
| Vulcanization 120° C. | min. | 25.0 | 23.0 | 22.0 |
| | +3 | 7.5 | >60 | >60 |
| | +10 | 10.5 | — | — |
| MECHANICAL PROPERTIES | | | | |
| Elongation at break (%) | 40 mn | 362.0 | 406.0 | 568.0 |
| Tensile strength (MPa) | 40 mn | 18.0 | 18.2 | 18.3 |
| Modulus 100 (MPa) | 40 mn | 2.6 | 2.1 | 1.5 |
| Modulus 200 (MPa) | 40 mn | 7.0 | 5.8 | 3.7 |
| Modulus 300 (MPa) | 40 mn | 13.7 | 11.7 | 7.1 |
| Hardness (PTS) | 40 mn | 60.0 | 56.5 | 50.0 |
| Crystallization, 12° C. | 7 hours | 19 | 19 | 19 |
| Crystallization, 12° C. | 72 hours | 53 | 53 | 53 |

The single accompanying figure displays vulcanization curves, for two copolymer products with different levels of 1-CBD (Example Nos. 5 and 6) polymerized at 30° C. and, for comparative purposes, for a product (B) polymerized at approximately 70° C. according to the discontinuous process.

When 1-CBD is contained at a rather high level (Example No.6) a high-slope curve is obtained. By modifying the level of 1-CBD, the vulcanization speed decreases.

This property may prove to be interesting in order to increase the productivity in fabrication facilities.

We claim:

1. A process for preparing a (co)polymeric rubber of polychloroprene by emulsion polymerizing monomers, which monomers comprise chloroprene, the process comprising:
    (a) forming an emulsion from which the polymerization is started, the emulsion comprising a fraction of the monomers, the conversion rate of the monomers at the end of this step is in the range of from about 3 to 80%;
    (b) feeding the remaining monomers to the emulsion and allowing the polymerization to proceed; and
    (c) optionally continuing the polymerization until reaching an overall conversion rate of the monomers in the range of from about 60 to 85%;
    wherein the monomer/polymer weight ratio during steps (a), (b), and (c) is maintained at about 0.20 or more, and wherein the emulsion pH is alkaline and in the range of from about 11 to 13.

2. The process according to claim 1, wherein the step (c) polymerization is continued until the overall conversion rate of the monomers is in the range of from about 65 to 80%.

3. The process according to claim 1, wherein a weight ratio of monomer:polymer is maintained at about 0.25 or more essentially throughout the polymerization.

4. The process according to claim 3, wherein the weight ratio of monomer:polymer is maintained at about 0.3 or more essentially throughout the polymerization.

5. The process according to claim 4, wherein the weight ratio of monomer:polymer is maintained in the range of from about 0.3 to 2 essentially throughout the polymerization.

6. The process according to claim 1, wherein the conversion rate of the monomers at the end of step (a) is in the range of from about 8 to 45%.

7. The process according to claim 6, wherein the conversion rate of the monomers at the end of step (a) is in the range of from about 10 to 30%.

8. The process according to claim 1, wherein the fraction of the monomers is about 1 to 50% by weight based on the total weight of monomers.

9. The process according to claim 8, wherein the fraction of the monomers is about 3 to 25% by weight based on the total weight of monomers.

10. The process according to claim 1, wherein the monomers consist essentially of chloroprene.

11. The process according to claim 1, wherein the monomers comprise a mixture of chloroprene and 1-chlorobutadiene, wherein the 1-chlorobutadiene is present in an amount up to 50% by weight of the total weight of monomers.

12. The process according to claim 11, wherein the amount of 1-chlorobutadiene is present in an amount up to 20% by weight of the total weight of monomers.

13. A process for preparing a (co)polymeric rubber of polychloroprene by emulsion polymerizing monomers, which monomers comprise chloroprene, the process comprising:
    (a) forming an emulsion from which the polymerization is started, the emulsion comprising a fraction of the monomers, the conversion rate of the monomers at the end of this step is in the range of from about 3 to 80%;
    (b) feeding the remaining monomers to the emulsion and allowing the polymerization to proceed; and
    (c) optionally continuing the polymerization until reaching an overall conversion rate of the monomers in the range of from about 60 to 85%;

wherein the monomer/polymer weight ratio during steps (a), (b), and (c) is maintained at about 0.20 or more, and wherein the emulsion polymerization is carried out in the presence of a protective colloid.

14. The process according to claim 13, wherein the step (c) polymerization is continued until the overall conversion rate of the monomers is in the range of from about 65 to 80%.

15. The process according to claim 13, wherein a weight ratio of monomer:polymer is maintained at about 0.25 or more essentially throughout the polymerization.

16. The process according to claim 15, wherein the weight ratio of monomer:polymer is maintained in the range of from about 0.3 to 2 essentially throughout the polymerization.

17. The process according to claim 13, wherein the conversion rate of the monomers at the end of step (a) is in the range of from about 8 to 45%.

18. The process according to claim 13, wherein the fraction of the monomers is about 1 to 50% by weight based on the total weight of monomers.

19. The process according to claim 13, wherein the monomers consist essentially of chloroprene.

20. The process according to claim 13, wherein the monomers comprise a mixture of chloroprene and 1-chlorobutadiene, wherein the 1-chlorobutadiene is present in an amount up to 50% by weight of the total weight of monomers.

* * * * *